(12) United States Patent
De Koning et al.

(10) Patent No.: US 7,495,057 B2
(45) Date of Patent: Feb. 24, 2009

(54) LPA HYBRIDE

(75) Inventors: Adrianus J De Koning, Zwolle (NL); Markus R Luesken, Zwolle (NL); Peter Dijkink, Balkbrug (NL)

(73) Assignee: DSM IP Assets B.V., Heerlen (NL)

( * ) Notice: Subject to any disclaimer, the term of this patent is extended or adjusted under 35 U.S.C. 154(b) by 82 days.

(21) Appl. No.: 10/474,440

(22) PCT Filed: Apr. 8, 2002

(86) PCT No.: PCT/NL02/00224

§ 371 (c)(1), (2), (4) Date: Oct. 9, 2003

(87) PCT Pub. No.: WO02/083758

PCT Pub. Date: Oct. 24, 2002

(65) Prior Publication Data

US 2004/0127650 A1 Jul. 1, 2004

(30) Foreign Application Priority Data

Apr. 12, 2001 (NL) .................................. 1017840

(51) Int. Cl.
*C08G 18/04* (2006.01)
*C08L 75/00* (2006.01)

(52) U.S. Cl. ............................. 525/126; 525/28; 528/76

(58) Field of Classification Search ........................ None
See application file for complete search history.

(56) References Cited

U.S. PATENT DOCUMENTS

| 5,147,646 A | * | 9/1992 | Graham | ...................... 424/424 |
| 5,159,044 A | * | 10/1992 | Bogner | ......................... 528/75 |
| 5,369,176 A | * | 11/1994 | De Koning | .................. 525/126 |

FOREIGN PATENT DOCUMENTS

| DE | 199 02 685 | | 8/2000 |
| EP | 197682 | * | 10/1986 |
| EP | 527 410 | | 2/1993 |

* cited by examiner

*Primary Examiner*—David Buttner
(74) *Attorney, Agent, or Firm*—Nixon & Vanderhye P.C.

(57) ABSTRACT

The invention relates to resin compositions that contains as components:

(A) a monomer with at least one ethylenic unsaturation and with an isocyanate reactive group,
(B) an ethylenically unsaturated monomer that can react with component (A) by means of radical polymerization,
(C) a polyisocyanate that can react with component (A) by means of a polyurethane reaction and that on average has at least 1.75 isocyanate groups,
(D) a catalyst for the radical polymerization, and that also contains
(E) a thermoplastic polymer with an average molecular weight of at least 10,000 Dalton.

The invention also relates to a process for the preparation of moulded articles from such resin compositions, as well as the moulded articles themselves.

19 Claims, No Drawings

LPA HYBRIDE

CROSS REFERENCE TO RELATED APPLICATION

This application is the National Phase of International Application PCT/NL02/00224 filed Apr. 8, 2002 which designated the U.S., and that International Application was published under PCT Article 21(2) in English.

The invention relates to a resin composition that contains (A) a monomer with at least one ethylenic unsaturation and with an isocyanate reactive group, (B) an ethylenically unsaturated monomer that can react with component (A) by means of radical polymerization, (C) a polyisocyanate that can react with component (A) by means of a polyurethane reaction and that has on average at least 1.75 isocyanate groups, and (D) a catalyst for the radical polymerization.

Such a resin composition is known from EP-B-0530302. The resin compositions as described in EP-B-0530302 contain: a component with a terminal ethylenic unsaturation and an isocyanate reactive group, an ethylenically unsaturated monomer that can react with the first-mentioned component by means of radical polymerization, a polyisocyanate with on average at least 1.75 isocyanate groups and catalysts needed for the radical polymerization and optionally for the polyurethane reaction. Since such resin compositions have a low viscosity at room temperature, they are eminently suitable for the preparation of moulded articles by means of resin injection into a mould. In such resin injection processes a resin composition is injected under pressure into a closed mould, in which optionally fibrous reinforcement material is present that is readily distributed throughout the resin composition, which is thin as water as it were, following which the resin composition is cured to form a moulded article and the moulded article is removed from the mould. Moulded articles obtained with this process can for instance be used in the automotive industry. If these moulded articles are fibre reinforced, they can be used in automotive components that are subjected to heavy loads, such as car bottoms. In these applications the fatigue properties (in particular the fracture toughness) and the mechanical properties are generally very important. More in particular the fatigue properties and the elongation at break and the impact resistance are very important. Moreover, high demands are to be met also by the surface properties of the moulded articles, certainly when the moulded articles are used as visible components in, for instance, cars. A drawback of the resin compositions as described in EP-B-0530302 is that in particular the fatigue properties, more specifically the fracture toughness, and the mechanical properties, more specifically the elongation at break and the impact resistance, of moulded articles prepared therefrom are inadequate for, inter alia, car components subjected to heavy loads.

The aim of the invention now is to provide a resin composition that on the one hand has a low viscosity, so that its processability is very good, and that cures rapidly, and that can on the other hand be used to prepare moulded articles with improved fatigue properties (in particular the fracture toughness) and with a good elongation at break and a good impact resistance. It goes without saying that moulded articles to be prepared from the resin composition that will be used as visible components will also have to meet high demands in terms of surface quality.

This aim is achieved according to the invention in that the resin composition, with the following components
(A) a monomer with at least one ethylenic unsaturation and with an isocyanate reactive group,
(B) an ethylenically unsaturated monomer that can react with component (A) by means of radical polymerization,
(C) a polyisocyanate that can react with component (A) by means of a polyurethane reaction and that has on average at least 1.75 isocyanate groups,
(D) a catalyst for the radical polymerization, also contains
(E) a thermoplastic polymer with an average molecular weight of at least 10,000 Dalton.

This ensures that the moulded articles prepared with these resin compositions exhibit very good fatigue properties, in particular a very good fracture toughness, as well as good mechanical properties, such as for instance elongation at break and impact resistance. In addition, the resulting moulded articles have good surface properties. They further have a good corrosion resistance, without this affecting the heat distortion temperature (HDT).

The resin compositions according to the invention have a low viscosity before the polyurethane reaction and the radical polymerization have taken place. The viscosity of the resin compositions usually lies between 1 and 400 mPa·s (measured at room temperature), and is often even lower than 200 mPa·s. As a result of this low viscosity the resin compositions have very good processing and fibre wetting properties.

The compositions according to the invention have a low viscosity and can therefore easily be cast or injected. It is very well possible to fill the compositions with fillers, fibre reinforcement materials and the like, without the viscosity increasing to such an extent that the composition can no longer be processed using the resin injection method.

The compositions according to the invention may also contain additives such as pigments, stabilizers, for instance antioxidants and UV stabilizers, as well as fillers such as for instance talc, mica, calcium carbonate, aluminium trihydrate or carbon black.

The compositions according to the invention preferably contain fibrous reinforcement material. The mechanical properties of the objects that can be prepared using the composition will then be even better. In general, 5 to 80 weight percent of fibrous reinforcement material can be added.

Examples of suitable fibrous reinforcement materials are glass fibres, carbon fibres and organic fibre materials, such as for instance aromatic polyamides and polyethylene. Said fibrous reinforcement materials may be present in any suitable form, for instance in the form of a mat, band or ribbon, in the form of continuous fibres or as chopped strands. In the case of continuous fibres, these may form a random structure or they may have been processed in a fabric.

In processing of the composition it is for instance possible to add the fibrous reinforcement material to the mixture to be injected, provided the fibres are short enough. This is called a RRIM technique (see further on in this application). It is also possible to introduce the fibrous reinforcement material into the mould (preferably already in a certain structure) before injection. This is called a SRIM technique (see further on in this application).

The thermoplastic polymer (E) used according to the invention is preferably dissolved in an ethylenically unsaturated monomer, and preferably in the form of a 30-45 wt. % solution, before being added to the resin composition.

The thermoplastic polymer (E) can be chosen from the group of thermoplastic polymers and copolymers (or mixtures thereof) customarily used as shrink-resistant additives in moulding compounds. Suitable examples are polyvinyl acetate, polyethylene vinyl acetate, polystyrene, polyacrylates, such as for instance polymethyl methacrylate, saturated polyesters or urethane-modified saturated polyesters, polyethylene, polyurethane, rubbers such as for instance styrene-butadiene block copolymers, styrene-butadiene rubbers, butadiene homopolymers, mixtures of butadiene homopolymers and butadiene-acrylonitrile copolymers, and the like.

In a number of cases it is also possible to use one or more of the above-mentioned polymers in carboxylated form, for instance as a copolymer with an ethylenically unsaturated carboxylic acid or a corresponding anhydride.

Thermoplastic polymers (E) that are particularly suitable are polyvinyl acetate homopolymers or polymethyl methacrylate. The moulded articles obtained when using these thermoplastic polymers (E) give the best results.

Examples of ethylenically unsaturated monomers in which the thermoplastic polymer (E) may optionally be dissolved, as well as of the ethylenically unsaturated monomers that can be used as component (B) in compositions according to the invention, include vinyl esters, vinyl ethers, aromatic vinyl compounds, vinyl nitriles, acrylates and methacrylates. More in particular, examples are styrene, α-methylstyrene, p-methylstyrene, vinyl toluene (a mixture of ortho-, meta- and para-vinyl toluene) and methyl, ethyl, or propyl acrylate or methacrylate. Mixtures of such monomers are also suitable. Particularly suitable are aromatic vinyl compounds, such as for instance styrene.

The amount of thermoplastic polymer (E), that is the amount of ther-moplastic polymer (E) as such, without taking into account the amount of ethylenically unsaturated monomer in which this thermoplastic polymer is optionally dissolved, preferably lies between 3 and 20 wt. %, and with particular preference between 7 and 15 wt. %, calculated relative to the weight of the total resin composition (A) up to and including (E). The weight of the total resin composition does include the amount of ethylenically unsaturated monomer in which (E) is optionally dissolved.

The component (A) used in the composition and the process according to the invention is a monomer with at least one ethylenic unsaturation and with an isocyanate reactive group. The isocyanate reactive group in component (A) is preferably a hydroxyl group. Preferably component (A) meets the following general formula:

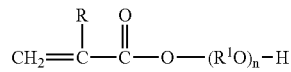

where
R is a hydrogen or methyl group,
$R^1$ is an alkylene group with 2 or 3 carbon atoms, and
n has a value in the range from about 1 up to and including 6.

The products to be used as component (A) can be prepared by reacting acrylic acid or methacrylic acid, or mixtures thereof, in a generally known manner with an alkylene oxide chosen from the group consisting of ethylene oxide and propylene oxide, or with mixtures of such compounds,. The integer n in the formula equals the ratio between the number of moles of alkylene oxide and the number of moles of acrylic acid and/or methacrylic acid.

Examples of components (A) that can suitably be used are polyoxyethylene(2) acrylate, polyoxyethylene(2) methacrylate, polyoxyethylene(3) acry-late, polyoxyethylene(3) methacrylate, polyoxypropylene(2) acrylate, polyoxypropylene(2) methacrylate, polyoxypropylene(3) acrylate and polyoxypropylene(3) methacrylate, polyoxyethylene(5) methacrylate, polyoxypropylene(3,5) acrylate, polyoxypropylene(4,7) methacrylate, polyoxypropylene(5,8) acrylate and polyoxypropylene(6) methacrylate, and mixtures thereof.

Other examples of components (A) that can suitably be used include the hydroxyalkyl esters of acrylic acid or methacrylic acid, for instance 2-hydroxypropyl methacrylate, 2-hydroxyethyl methacrylate, 2-hydroxyethyl acrylate and 2-hydroxypropyl acrylate.

Components (B) that can suitably be used are ethylenically unsaturated monomers that can react with the ethylenic unsaturation of component (A) by means of radical polymerization. Suitable examples are vinyl monomers, for instance vinyl esters, vinyl ethers, aromatic vinyl compounds, vinyl nitriles, acrylates or methacrylates. Preferably use is made of styrene, α-methyl styrene, p-methyl styrene, vinyl toluene and methyl, ethyl or propyl (meth)acrylate. Mixtures of such monomers may also be used. It is also possible to combine these monomers with 1-25 wt. %, calculated relative to the total weight of ethylenically unsaturated monomers, of monomers with more than one ethylenic unsaturation, such as for instance divinyl benzene, diallyl phthalate or triallyl cyanurate.

The ethylenically unsaturated monomer may be the same as the ethylenically unsaturated monomer in which component (E) is optionally dissolved.

Suitable components (C) that can be used are polyisocyanates with on average at least more than 1.75 isocyanate groups and preferably 2 to 3 isocyanate groups per molecule. More preferably the number of isocyanate groups (also referred to as the functionality) is on average 2.2 to 2.7. The polyisocyanate may for instance be an aliphatic, an aromatic or a cycloaliphatic polyisocyanate or a mixture of two or more different types. Particularly suitable examples of aromatic diisocyanates are 4,4'-diphenyl methylene diisocyanate (MDI) and polymer MDI (PMDI, a mixture of mainly 4,4'- and 2,4'- and 2,2'-diphenyl methylene diisocyanate), polycarbodiimide-modified diphenyl methylene diisocyanate. Other suitable examples of components (C) that can be used are toluene diisocyanate (TDI), for instance as a mixture (e.g. 80/20 or 65/35 mixtures) of 2,4 and 2,6 isomers, as pure 2,4 or 2,6 isomer or as non-distilled TDI, 1,5-naphthalene diisocyanate (NDI), 1,8-naphthalene diisocyanate, 1,4-anthracene diisocyanate, cumene-2,4-diisocyanate, durene diisocyanate, 2,4-stilbene diisocyanate, 4-(m)ethoxy- and 4-halo-1,3-phenylene diisocyanate, p-phenylene diisocyanate (PPDI), 4,4'-dibenzyl diisocyanate, 2,4'-diisocyanato diphenylether, 2,4-dimethyl-1,3-phenylene diisocyanate, 5,6-dimethyl-1,3-phenylene di-isocyanate, 4,6-dimethyl-1,3-phenylene diisocyanate 4,4'-diisocyanato diphenylether benzidine diisocyanate, 3,3'-dimethyl-4,4'-diisocyanato diphenyl, 3,3'-dimethoxy-4,4'-diisocyanato diphenyl, etc. Suitable examples of aliphatic diisocyanates are hexamethylene diisocyanate (HDI), isophorone diisocyanate (IPDI), hydrogenated MDI (HMDI), tetra and trimethyl hexamethylene diisocyanate, transcyclohexane-1,4-diisocyanate (CHDI). Preferably the polyisocyanate is 4,4'-diphenyl methylene diisocyanate (MDI), a polymeric MDI or a polycarbodiimide-modified diphenyl methylene diisocyanate.

It is possible to influence the crosslink density of the products to be obtained from the resin composition by adding monofunctional isocyanates or monoalcohols or monoamines without ethylenic unsaturation. It is also possible, and this is to be preferred, to vary the number of crosslinks per quantity of composition through the use of an additional component (F) with more than one isocyanate reactive group. This component (F) can suitably be chosen from the group of diols, polyols and other components with more than one isocyanate reactive group, such as for instance diamines or amino alcohols. If desired, the crosslink density can also be influenced by adding a polyisocyanate excess. This results in the formation of longer polyurethane sections between the crosslinking points.

The number of isocyanate groups (from component (C)) relative to the number of isocyanate reactive groups (from component (A), and—if present—from component (F)) is preferably at least 0.8 (mol/mol). It is possible to use a higher number of isocyanate groups relative to the number of isocyanate reactive groups, for instance up to a ratio of about 2 (mol/mol). At too high ratios, however, the mechanical properties of objects prepared from the composition deteriorate. Preferably the ratio is chosen so that no free isocyanate is left after the reaction of the isocyanate reactive groups with the isocyanate.

Preferably the components (A), (B) and (C) of the composition according to the invention consist of monomers with a molecular weight below 500.

In the resin compositions according to the invention the weight ratio between the total amount of ethylenically unsaturated monomer and the amount of component (A), the monomer with at least one unsaturation and an isocyanate reactive group usually lies between 95:5 and 5:95. Preferably this ratio lies between 80:20 and 20:80, and more in particular between 65:35 and 35:65. One skilled in the art will choose this weight ratio depending on the desired properties of the composition after curing.

It should be noted, incidentally, that EP-A-0197682 describes that polymerizable resin compositions can be prepared from methyl methacrylate and a solution of a shrink resistant additive in the reaction product of a polyisocyanate and hydroxyalkyl (meth)acrylate. The polyisocyanate is then always fully converted into an unsaturated urethane oligomer. The drawbacks of this composition are that first an unsaturated urethane oligomer is to be prepared and that subsequently a shrink-resistant additive is to be dissolved in the composition before a reaction can take place in the mould. The initial preparation of that unsaturated urethane oligomer also forms an economic drawback as it involves an extra operation.

The resin composition according to the invention also contains a catalyst (D) for the radical polymerization. This catalyst promotes the reaction of ethylenically unsaturated monomer with the ethylenic unsaturation in component (A). This may in principle be the same catalyst systems as used in the polymerization of unsaturated polyesters. Examples of such substances that develop radicals are peroxides, such as hydroperoxides or ketone peroxides, as well as peresters. Examples of suitable catalysts (D) that can be used are benzoyl peroxide, di-t-butyl peroxide, cyclohexanone peroxide, tertiary butyl perbenzoate and tertiary butyl per-octanoate. Use can also be made of photoinitiators sensitive to visible or ultraviolet light. Mixtures of such catalysts can also be used.

The amount of catalyst for the radical reaction usually amounts to between 0.5 and 5 wt. %, calculated relative to the total weight of the unsaturated components. In addition, an accelerator may be present, for instance a cobalt compound or an amine.

Preferably the resin composition additionally contains a catalyst for the polyurethane reaction. A polyurethane reaction is understood to be the reaction between the isocyanate reactive group from component (A) (and optionally also these groups from component (F)) with the isocyanate groups from component (C).

Catalysts suitable for use for the polyurethane reaction are transition metal salts, such as for instance salts of tin, bismuth and mercury; for instance tin oc-tanoate or dibutyl tin dilaurate. Other suitable catalysts for the polyurethane reaction are for instance tertiary alkyl aliphatic amines, such as for instance N,N-dimethyl benzylamine, diamino bicyclooctane (DABCO), N,N-dimethyl cyclohexylamine (DMCHA), N,N-dimethyl aminoethanol, bis-(2,2-dimethyl aminoethyl) ether. A most particularly suitable catalyst for the polyurethane reaction is dibutyl tin dilaurate.

When besides the catalyst for the radical reaction use is also made of a catalyst system for the polyurethane reaction, gelling may take place very rapidly during processing, so that short cycle times can be realized in the production of moulded articles, etc.

Preferably the resin composition according to the invention consists at least of two separate sub-mixtures, with the components (A) up to and including (E) and optionally (F) each being present in one or more of these sub-mixtures, it being understood that component (A) and component (C) in that case are present in separate sub-mixtures. The submixtures may be packed in all kinds of packagings, such as for instance drums or containers.

Preferably a first submixture contains the components (A), (B) and (E) and the optional additives, such as for instance the catalyst for the polyurethane reaction. A second sub-mixture preferably contains the component (C) and the catalyst (D) for the radical polymerization. If desired, the catalyst (D) for the radical-polymerization may also be present in a third submixture.

The invention also relates to a process for the preparation of moulded articles by injecting a resin composition according to the invention under pressure into a closed mould, in which optionally fibrous reinforcement material is present, curing the resin composition and removing the moulded article from the mould.

Examples of such processing methods are reaction injection moulding (RIM), resin transfer moulding (RTM), reinforced reaction injection moulding (RRIM), pultrusion, vacuum assisted resin infusion (VARI) and structural reaction injection moulding (SRIM), with the polyurethane reaction and the radical polymerization taking place in the mould. For a detailed discussion of the various processing techniques to be applied, such as RTM, RIM, SRIM, RRIM and pultrusion, the reader is for instance referred to Composite Materials Technology (Processes and Properties) by P. K. Mallick/S. Newman (Eds.), 1990, Hanser Publishers, Munich Vienna New York (ISBN 3-446-15684-4). In particular, they are referred to the chapters 4-6, viz.:

Chapter 4: Reaction Injection Moulding (Greg Slocum); pages 103-148;

Chapter 5: Resin Transfer Moulding (Carl E. Johnson); pages 149-178;

Chapter 6: Continuous Fiber Molding Processes

Part A: Filament Winding (Howard S. Kliger/Brian A. Wilson); pages 179-210;

Part B: Pultrusion (Clint Smith/Jerry Stone); pages 211-236.

On the other processing techniques, too, a great deal of literature is available.

Finally, the invention also relates to moulded articles prepared from a resin composition according to the invention or prepared according to the process of the invention.

The invention will be explained on the basis of the following examples, without however being restricted to these.

The viscosity was determined using a Brookfield Viscosimeter type HBTD with spindle 2, at 100 rpm. The mechanical properties and fatigue properties were determined in the following way:

Flexural DroPerties (in particular flexural strength and flexural modulus) were determined according to ISO 178.

Fatigue was determined using a method analogous to ISO 178. This involved varying the stress applied to a test bar, with a frequency of 5 Hz, between 10 MPa and the flexural stress to be measured. The number of cycles to break was each time measures and plotted in a Wöhler curve. Thus, the fatigue strength upon $10^6$ cycles can be estimated as a percentage of the flexural strength.

Fracture toughness, expressed in K1c and G1c values, was measured according to ASTM D 5045-93.

EXAMPLE I 7.5 g dibenzoyl peroxide (powder with a concentration of 50%) was dissolved in a mixture of 158.5 g styrene, 139.5 g hydroxyethyl methacrylate and 62.5 g polyvinyl acetate solution (a 40 wt. % solution of polyvinyl acetate homopolymer in styrene; Vinnapas UW-1, with a molecular weight of 150,000 g/mol; Wacker, Germany). Then 1 g Byk A555 (Byk Chemie, Germany) and 0.1 g dibutyl tin dilaurate (Tinstab BL277 from Akcros Chemicals, Germany) were added. This mixture was subsequently deaerated in a vacuum stove. To this deaerated mixture 0.75 g dimethyl aniline (Accelerator NL63-100 from Akzo Nobel, Netherlands) and 139.5 g methylene-4,4'-diphenyl diisocyanate (Lupranat MIS from BASF, Germany) were added. The resulting mixture was again deaerated.

This mixture was then cast between two flat, chrome-plated plates measuring 20×40 cm that were at a distance of 4 mm from each other. The resulting plate was cured for 24 hours at room temperature, following which the plate was released from the mould and post-cured for 4 hours at 100° C. and for 1 hour at 150° C. Test bars were then cut from this plate in order to measure the fracture toughness. The values found for viscosity, K1c and G1c are presented in Table I.

EXAMPLE II

The process of Example I was repeated, now with the following quantities of monomers: 110 g styrene, 132.5 g hydroxyethyl methacrylate, 125 g polyvinyl acetate solution (PVAc) and 132.5 g Lupranat MIS. The values found for viscosity, K1c and G1c are presented in Table I.

EXAMPLE III

The process of Example I was repeated, now with the following quantities of monomers: 62.5 g styrene, 125 g hydroxyethyl methacrylate, 187.5 g polyvinyl acetate solution and 125 g Lupranat MIS. The values found for viscosity, K1c and G1c are presented in Table I.

Comparative Experiment A

The process of Example I was repeated, except for the addition of the polyvinyl acetate solution. The other monomers were added in the following amounts: 206 g styrene, 147 g hydroxyethyl methacrylate and 147 g Lupranat MIS. The values found for viscosity, K1c and G1c are presented in Table I .

TABLE I

| Example | I | II | III | A |
|---|---|---|---|---|
| PVAc (wt. %) | 5 | 10 | 15 | 0 |
| viscosity (mPA · s) | 14 | 42 | 99 | 237 |
| K1c (MN/m/m) | 1.18 | 1.73 | 1.97 | 0.78 |
| G1c (kJ/m$^2$) | 0.41 | 0.95 | 1.33 | 0.21 |

EXAMPLE IV

A mixture of 66 g styrene, 79.5 g hydroxyethyl methacrylate, 75 g polyvinyl acetate solution (as in Example I), 79.5 g methylene-4,4'-diphenyl diisocyanate (Voranate M220 from Dow Chemicals, Netherlands), 0.3 g cobalt (II)-2-ethylhexanoate (Accelerator NL-49P from Akzo Nobel, Netherlands) and 3 g t-butylperoxy-3,5,5-trimethyl hexanoate (Trigonox 42PR from Akzo Nobel, Netherlands) and 0.01 g dibutyl tin dilaurate was used to make a laminate by means of the following process:

Eight layers of a carbon fibre fabric from Cramer & Co, type Style 475 of 285 g/m$^2$, were placed in a steel mould, measuring 30×30 cm, that had been heated to 70° C. The mould was then closed until a 2.5 mm product space was formed. The mixture was injected into the mould at a pressure of 2 bar. The injection time was about 1 minute. The laminate was cured for 15 minutes in the mould at 7020 C. After release the laminate was post-cured for 4 hours at 100° C. and then for 1 hour at 150° C.

Test bars were cut from this laminate for measurement of the flexural properties and the fatigue strength. These properties are presented in Table II.

Comparative Experiment B

According to the process described in Example IV a second laminate was made from the following mixture without polyvinyl acetate solution: 123.6 g styrene, 88.2 g hydroxyethyl methacrylate, 88.2 g methylene-4,4'-diphenyl-diisocyanate, 0.3 g cobalt(II)-2-ethyl hexanoate and 3 g t-butylperoxy-3,5,5-trimethyl hexanoate.

The flexural properties and the fatigue strength are presented in Table II.

TABLE II

| Example | IV | B |
|---|---|---|
| Flexural strength (MPa) | 814 | 783 |
| Flexural modulus (GPa) | 45.8 | 53.9 |
| Fatigue strength (MPa) | 624 | 431 |
| Fatigue strength (%) | 77 | 55 |

Fatigue strength (MPa) = flexural stress at which break occurs after 1,000,000 load cycles.
Fatigue strength (%) = fatigue strength (MPa) / flexural strength (MPa) × 100%.

The invention claimed is:

1. Unreacted resin composition with a viscosity between 1 and 400 mPa·s (measured at room temperature) that consists essentially of components (A) to (E) and, optionally (F) to (H):
   (A) a monomer with at least one ethylenic unsaturation and with an isocyanate reactive group,
   (B) an ethylenically unsaturated monomer which is an aromatic compound that can react with component (A) by means of radical polymerization,
   (C) a polyisocyanate that can react with component (A) by means of a polyurethane reaction and that has on average at least 1.75 isocyanate groups,
   (D) a catalyst for the radical polymerization, the resin composition also containing
   (E) a thermoplastic polymer with an average molecular weight of at least 10,000 Dalton, and, optionally, one or more of (F), (G), and (H):
   (F) a component with more than one isocyanate reactive group,
   (G) a catalyst for the polyurethane reaction,
   (H) one or more additives.

2. Resin composition according to claim 1, wherein the thermoplastic polymer (E) is dissolved in an ethylenically unsaturated monomer, before being added to the resin composition.

3. Resin composition according to claim 1, wherein the thermoplastic polymer (E) is a polyvinyl acetate homopolymer and/or polymethyl methacrylate.

4. Resin composition according to claim 1, wherein the amount of thermoplastic polymer (E) lies between 3 and 20 wt. %, calculated relative to the weight of the total resin composition (A) up to and including (E).

5. Resin composition according to claim 1, wherein the isocyanate reactive group in component (A) is a hydroxyl group.

6. Resin composition according to claim 1, wherein component (A) is a monomer that meets the general formula:

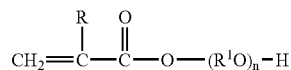

where R is a hydrogen or methyl group, $R^1$ is an alkylene group with 2 or 3 carbon atoms, and N has a value in the range from about 1 up to and including 6.

7. Resin composition according to claim 1, wherein component (C) is a 4,4'-diphenyl methylene diisocyanate (MDI) or a polymer diphenyl methylene diisocyanate (PMDI) or a polycarbodiimide-modified diphenyl methylene diisocyanate.

8. Resin composition according to claim 1, wherein the component (F) with more than one isocyanate reactive group, is present.

9. Resin composition according to claim 1, wherein the number of isocyanate groups (from component (C)) relative to the number of isocyanate reactive groups (from component (A), and-if present-from component (F)) is at least 0.8 (mol/mol).

10. Resin composition according to claim 1, wherein the weight ratio of the total amount of ethylenically unsaturated monomer relative to the amount of component (A) lies between 80:20 and 20:80.

11. Resin composition according to claim 1, wherein the resin composition also contains a catalyst for the polyurethane reaction.

12. Resin composition according to claim 1, wherein the resin composition consists of at least two separate sub-mixtures, the components (A) up to an including (E) and optionally (F) each being present in one or more of these sub-mixtures, it being understood that component (A) and component (C) are present in separate sub-mixtures.

13. Process for the preparation of moulded articles comprising injecting a resin composition according to claim 1 under pressure into a closed mould, where optionally fibrous reinforcement material is present, curing the resin composition and removing the moulded articled from the mould.

14. Moulded article prepared from a resin composition according to claim 1.

15. Resin composition according to claim 1, wherein the weight ratio of the total amount of ethylenically unsaturated monomer relative to the amount of component (A) lies between 65:35 and 35:65.

16. Moulded article prepared according to the process of claim 13.

17. Resin composition according to claim 1, wherein the thermoplastic polymer (E) is dissolved in an ethylenically unsaturated monomer, in the form of a 30-45 wt. % solution, before being added to the resin composition.

18. Resin composition according to claim 1, wherein the amount of thermoplastic polymer (E) lies between 7 and 15 wt. %, calculated relative to the weight of the total resin composition (A) up to and including (E).

19. Resin composition according to claim 1, which includes from 5 to 80 weight percent of fibrous reinforcement material.

* * * * *